Jan. 22, 1957  L. M. BOHO  2,778,594
SUPPORT FOR CAN OPENERS AND THE LIKE
Filed June 26, 1953
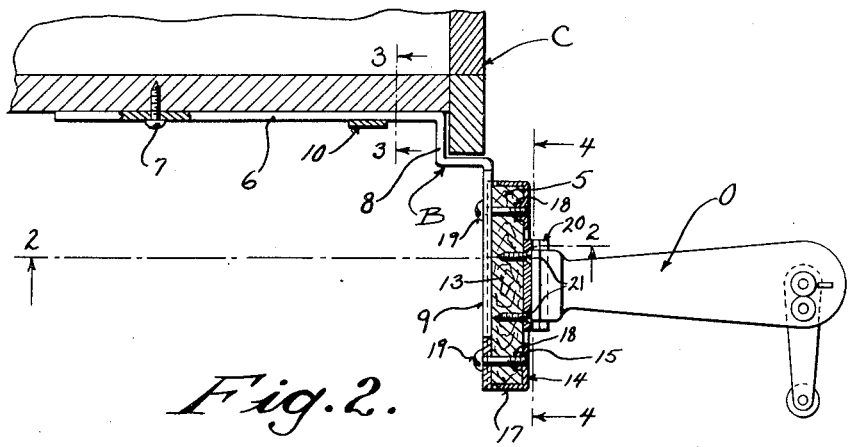
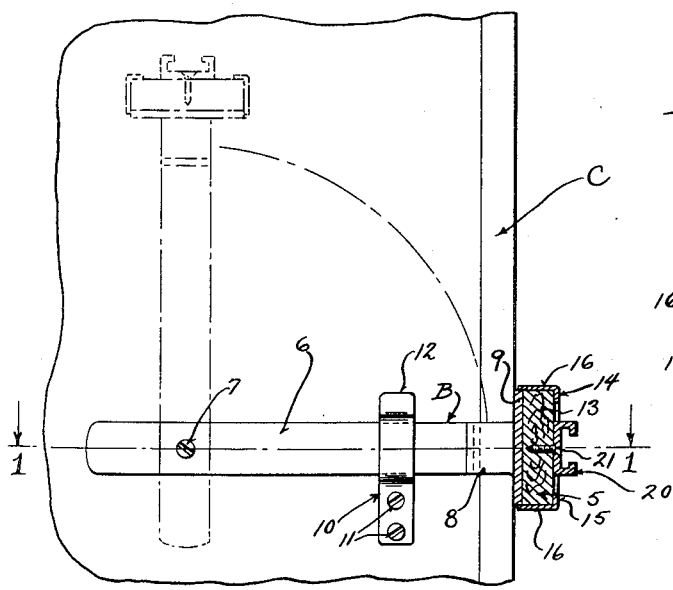
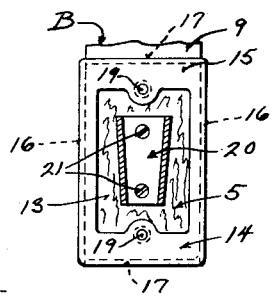
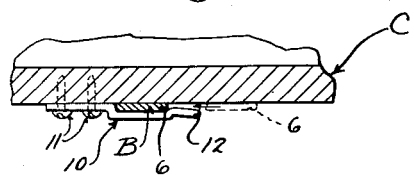
INVENTOR
LAWRENCE M. BOHO
BY
*Young Wright*
ATTORNEYS

United States Patent Office 2,778,594
Patented Jan. 22, 1957

2,778,594

SUPPORT FOR CAN OPENERS AND THE LIKE

Lawrence M. Boho, Chicago, Ill.

Application June 26, 1953, Serial No. 364,368

1 Claim. (Cl. 248—205)

This invention appertains to disappearing brackets for supporting kitchen articles, such as can openers, and is a continuation in part from my pending application, Serial Number 285,660, filed May 2, 1952.

One of the primary objects of my present invention is the provision of a bracket movable to an inoperative out of the way position under a kitchen cabinet or the like, and to an operative exposed position for receiving and supporting a can opener or other implement with means on its outer end for facilitating the rigid fastening thereto of different sizes and shapes of sockets for such implements, whereby the bracket can be successfully used for supporting implements of various makes now found on the market.

Another salient object of my invention is the provision of a block for receiving any arrangement of fastening screws employed for securing a certain make of socket to the depending leg of the supporting bracket, with novel means for encasing the block to hold the same on the leg and to prevent splitting of the block.

A further important object of my invention is the provision of means for holding a block on the leg of a bracket in such a manner that the block can be renewed when mutilated or worn out.

A still further object of my invention is to provide a supporting bracket for kitchen utensils, such as a can opener, employing a pivoted arm carried by the lower surface of a cabinet or the like, which can be swung to an inoperative hidden position when not in use, and outward to an exposed position for receiving the can opener or the like; means being provided for effectively supporting the arm against sag, when the arm is moved to its operative exposed position.

With these and other objects in view, the invention consists in the novel construction, arrangement and formation of parts as hereinafter more specifically described and claimed, and illustrated in the accompanying drawing, in which drawing, Figure 1 is a fragmentary side elevational view through a kitchen cabinet showing my novel bracket and block carried thereby, with parts of the bracket and block being shown in section and such section being taken on the line 1—1 of Figure 2, looking in the direction of the arrows.

Figure 2 is a bottom plan view partly in section and the section being taken on the line 2—2 of Figure 1 looking in the direction of the arrows and illustrating in dotted lines the inoperative hidden position of the bracket beneath the cabinet.

Figure 3 is a detail transverse sectional view taken on the line 3—3 of Figure 1, looking in the direction of the arrows, illustrating the means employed for supporting the arm against sag, when the arm is in its extended operative position.

Figure 4 is a detail sectional view taken on the line 4—4 of Figure 1, looking in the direction of the arrows and illustrating more particularly the securing of one type of socket to the block carried by the bracket.

Referring to the drawing in detail, wherein similar reference characters designate corresponding parts throughout the several views, the letter B generally indicates one type of my improved bracket, adapted to be carried by the lower face of a kitchen cabinet C or the like, for supporting a can opener O, or other desired implement.

One of the important features of my present invention is the provision of means generally indicated by the reference character 5 for connecting various makes of can openers O and the like to a supporting bracket B and this will be later described in detail.

The bracket B includes an elongated arm 6, which is pivoted adjacent to its inner end, by means of a screw or the like 7 to the under side of the cabinet C. The outer end of the arm is provided with an offset portion 8 and a depending leg 9 which carries the means 5 for supporting the can opener O. The arm 6 can be readily swung on its pivot 7 to an out of the way hidden position as shown in dotted lines, Figure 2, or to an extended operative position, as shown in full lines in Figures 1 and 2.

When the arm 6 is swung to its operative extended position, the same is effectively supported against sag by a clip 10 or the like. This clip is securely fastened to the under side of the cabinet C by screws 11 and this clip is of a resilient nature, so that the arm 6 can be sprung in between the clip and the lower surface of the cabinet C. The clip can be provided with a guide tongue 12 and this guide tongue is slightly offset, so that when the arm 6 is in its swung out operative position accidental turning movement of the arm on its pivot 7 is prevented.

The means 5 for supporting the can opener O forms one of the salient features of this invention, as heretofore stated, and this means includes a block of wood or the like 13 which is encased and held in place by a sheet metal frame 14. This sheet metal frame 14 includes a front plate 15, inwardly directed side walls or flanges 16 and end walls 17. The front wall or plate 15 is partially open so as to expose the block of wood 13 to view, for a purpose, which will later appear, and this wall or plate has formed thereon inwardly directed internally threaded sockets 18. Screws 19 extend through the leg 9 and into the sockets 18 and by tightening the screws, the frame can be drawn tight around the block to hold the block in position. The side walls 16 are of a greater width than the end walls 17, and these end walls extend over the edges of the leg 9. The end walls 17 terminate short of the leg, so as to permit the drawing of the frame into tight contact with the block. The frame prevents splitting of the block, but when the block becomes worn, the same can be easily replaced by merely removing the screw 19. The exposed face of the block 13 can receive any pattern of fastening screws employed for securing a socket 20 thereto. In can openers and like kitchen implements, a socket is provided for permitting the can opener to be detachably secured to a desired support. In various makes of can openers some of the sockets are provided with two or three holes for screws, arranged in different places, and obviously, with the block of wood screws 21 for a particular socket 20 can be readily threaded into the block or in fact, the block itself can be provided with a series of holes into which screws can be threaded.

From the foregoing description, it can be seen that not only have I provided a novel bracket for supporting a can opener, but also a novel means for permitting the association of a can opener with a bracket.

Changes in details may be made without departing from the spirit or the scope of this invention, but what I claim as new is:

A support for can openers and other kitchen appliances comprising a bracket having a depending supporting leg, a block of wood fitted flat against the outer face of the leg adapted to receive any pattern of fastening screws for supporting a socket of a kitchen appliance, a frame for encasing said block to prevent splitting thereof, said frame including a front wall having a relatively large central portion thereof cut out to expose the block to view, side walls on the front wall engaging the sides of the block and the leg, end walls on the front wall engaging the ends of the block and terminating short of the leg, said front wall having internally threaded sockets, and screws passing through said leg and threaded into said sockets for drawing the frame toward the leg and the block in intimate contact with the leg.

References Cited in the file of this patent

UNITED STATES PATENTS

| | | |
|---|---|---|
| 214,058 | Smith | Apr. 8, 1879 |
| 1,349,325 | Davis | Aug. 10, 1920 |
| 1,368,805 | Johnson | Feb. 15, 1921 |
| 1,548,692 | Wannenwetsch | Aug. 4, 1925 |
| 1,763,764 | Dignan | June 17, 1930 |
| 1,912,682 | Belt | June 6, 1933 |
| 2,443,149 | Rundell | June 8, 1948 |
| 2,634,077 | Van Dusen | Apr. 7, 1953 |
| 2,651,486 | Woodward | Sept. 8, 1953 |